May 20, 1958 J. G. CAPSTAFF 2,835,180
CONTINUOUS PRINTER FOR SOUND-COLOR FILM
Filed July 1, 1954 2 Sheets-Sheet 1

John G. Capstaff
INVENTOR.

BY
ATTORNEYS

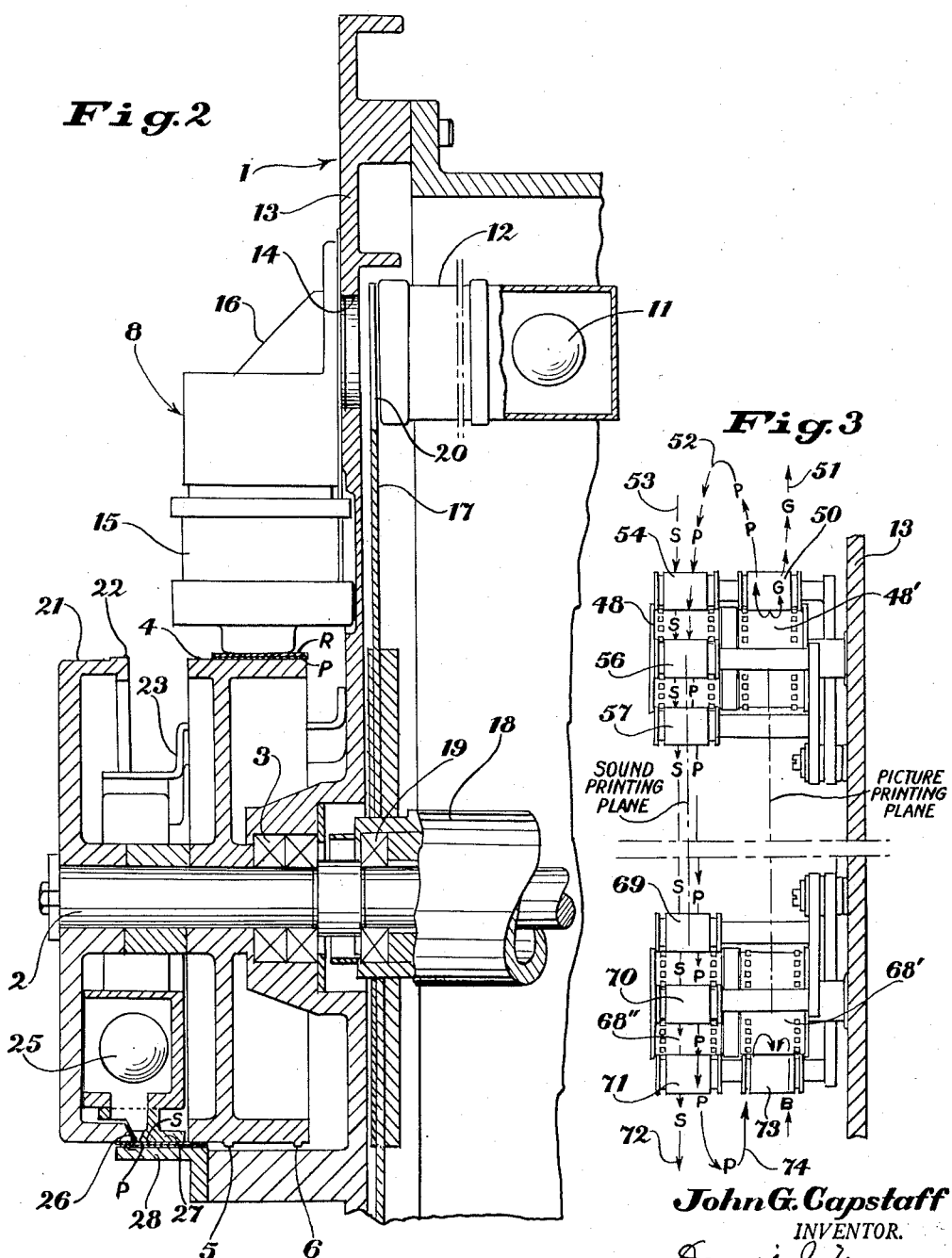

United States Patent Office 2,835,180
Patented May 20, 1958

2,835,180

CONTINUOUS PRINTER FOR SOUND-COLOR FILM

John G. Capstaff, Rochester, N. Y., assignor to Eastman Kodak Company, Rochester, N. Y., a corporation of New Jersey Application July 1, 1954, Serial No. 440,585

7 Claims. (Cl. 95—75)

In the preparation of film for color-sound pictures, one known method of forming the composite print is to expose a sensitized film strip successively to each of a plurality of so-called color separation prints or negatives, each of which corresponds to one of the three color components of the finished picture. The sensitized strip is then exposed also to a film having a master sound track photographically recorded thereon and upon developing the exposed film, a complete sound-color positive print is obtained. Many arrangements have been proposed heretofore for performing the various operations required in this process but they have been open to objection in that they are unduly complicated and require a considerable amount of attention on the part of the operator or operators in order to maintain the various films in proper registry with one another.

It is an object of this invention to provide a continuous printer for such film which is relatively simple in construction and yet which will serve to sequentially expose a sensitized film to each of three component color films and to a master sound track, but which will, at the same time, maintain proper registration of the films in respect to one another and will require a minimum amount of attention on the part of the operator.

A further object is to provide a continuous printer wherein the exposure stations for exposing the sensitized film to each of the color separation films are distributed about the periphery of a single printing drum, the films being so guided into and away from contact with the drum that they will be maintained in proper register at each of the printing stations.

A still further object is to provide such a printer wherein the printing stations incorporate sources of light so located that the filaments of the light sources may be maintained vertically at all times and a single shutter may be provided for controlling the exposure of the film at all three picture printing stations.

A still further object is to provide a sound printing sprocket mounted coaxially with the picture printing drum and spaced therefrom slightly less than the width of the film being handled whereby the sound printing head may be located in the space between the sound sprocket and the printing drum.

Further objects will become apparent from the following description and claims, especially when considered in the light of the accompanying drawings.

In the drawings,

Fig. 2 is a fragmentary, transverse sectional view taken on the plane designated by the line 2—2 in Fig. 1.

Fig. 3 is a fragmentary sectional view showing the details of construction of certain of the guide mechanism used in my invention.

Figure 1:
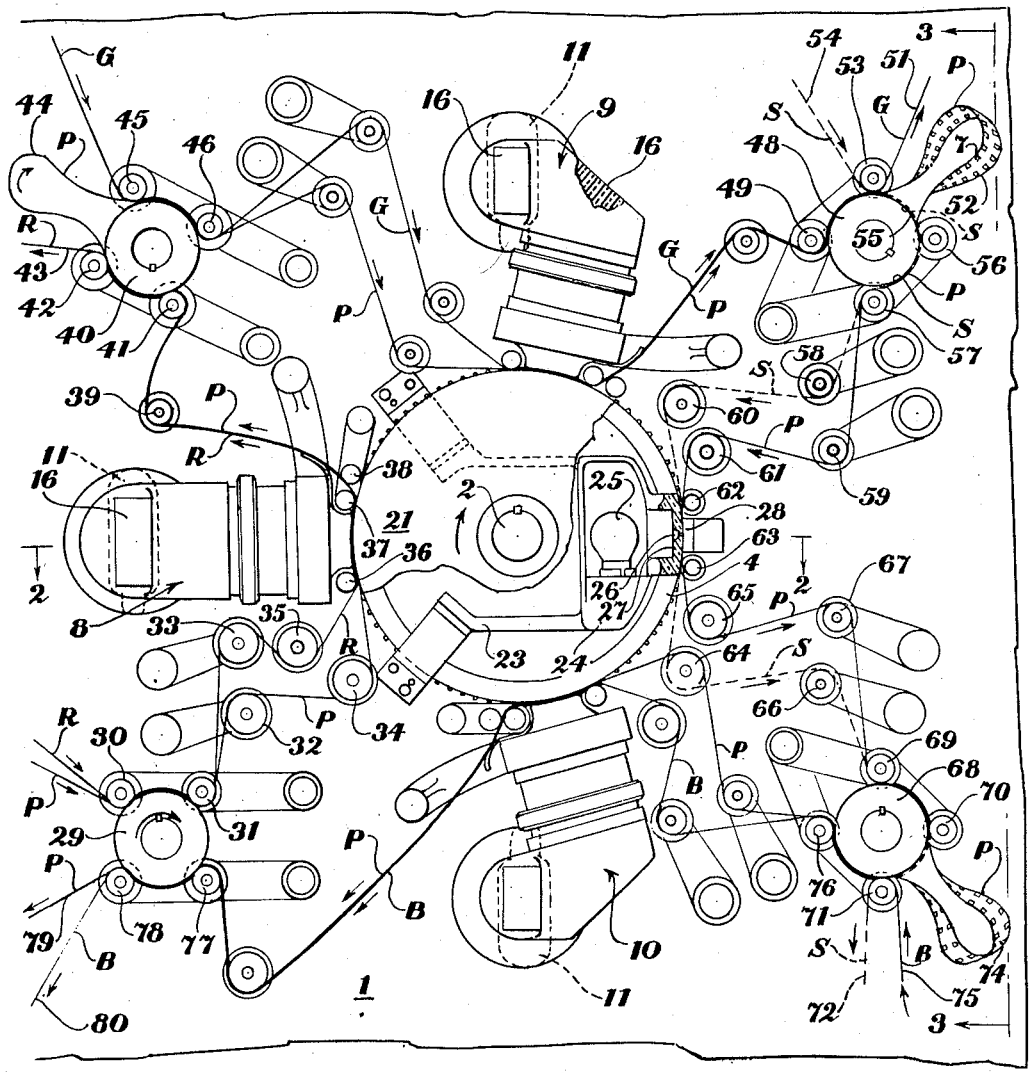
Fig. 1 is a front elevation view, somewhat diagrammatic in character, of the complete printer of my invention.

The present photographic printer is an improvement over the printer fully shown and claimed in my prior Patent 2,525,522 and includes a main frame or housing 1 from which extends rotatable shaft 2, journalled in the housing by means of suitable bearings 3 and carrying externally of the housing a printing drum or sprocket 4. Drum 4 is preferably of the type shown and claimed in my prior Patent 2,552,255 and, as fully described therein, is provided with rows of spaced teeth 5 and 6 arranged about the periphery of the drum and so arranged as to engage the usual perforations 7 of a pair of superimposed film strips held against the periphery of the drum and to advance the strips in exact registry with one another past each of the plurality of printing stations 8, 9 and 10, carried by the frame at spaced locations about the periphery of the drum. As is set forth in each of the above-mentioned prior patents, the teeth are so designed as to permit slight relative movement of the film strips as they approach the actual printing position and then to maintain them in fixed relationship to one another during the actual printing interval.

Each of the picture printing stations 8, 9 and 10 includes a light source 11 and a suitable optical system for projecting a beam of light onto the periphery of drum 4 so as to expose a sensitized film strip P to one of three master or color separation film strips R, G and B. Thus, at station 8 strip P will be exposed to the red separation strip R; at station 9 it will be exposed to the green separation strip G; and at 10 it will be exposed to the blue separation strip B.

As best shown in Fig. 2, the light source 8 and a portion of the optical system (not shown in detail) is mounted within a suitable housing 12 suitably carried within the main frame or housing 1 and spaced slightly inwardly from the inner face of the front plate 13 thereof opposite an opening 14 therethrough. The remainder of the optical system is mounted within a second housing portion 15 carried on the outer surface of plate 13 and includes a suitable prism or combination of prisms 16 for directing the light beam, which is projected through the opening 14 from the source 11, radially inwardly toward the periphery of the drum 4. The optical system used herein is preferably of the type shown and claimed in my co-pending application Serial No. 299,884, filed July 19, 1952, to which reference is made for the specific details of the system. However, obviously other optical systems could be employed. Regardless of the specific type of optical system, the novel arrangement of the parts as illustrated herein is of considerable importance. It will be noted that at each head the light source 11 is mounted in an upright position so that its filament (not shown) may be vertical. This is an especially important feature where high intensity illumination, with the resultant high temperatures, is employed since sagging of the filament, with its resulting detrimental effect on the focusing of the system, is thereby minimized. Moreover, by mounting the three light sources as shown and using prisms to deflect the beams toward the drum 4, use of a single rotatable disk shutter for sequentially and periodically controlling the exposure at all three stations is made possible.

Thus, as best shown in Fig. 2, a generally disk-shaped shutter 17 is mounted just rearwardly of plate 13 on a hollow shaft 18 which is in turn mounted by bearings 19 on shaft 2 for coaxial but independent rotation with respect to the shaft 2. Shutter 17 is of sufficient diameter to extend past and normally block light transmission through the openings 14 at each of the printing stations and is provided with a notch or cut-out 20 adjacent its outer edge which is adapted upon rotation of the shutter to sweep past each of the openings 14 to sequentially control the exposure at the stations. Shafts 2 and 18 are adapted to be simultaneously rotated, as by a suitable motor and gearing (not shown), at such relative velocities that the shutter 17 will make one full revolution during the time that the films are advanced one frame or exposure length on the periphery of the drum.

In addition to providing for the exposure of the picture areas of the sensitized film strip P to the three color separation strips R, G and B, the present printer also provides means for printing the sound track from a master sound film S onto the margin of the strip P so that, upon development of strip P, a composite sound-color print will be obtained. To this end a sound sprocket 21 is mounted on the outer end of shaft 2 in axially spaced relationship to drum 4, sprocket 21 being provided with a row of teeth 22 adapted to engage the perforations along one edge of the strips S and P. The space between sprocket 21 and drum 4 is of such width that the strips S and P, superimposed on one another, will just straddle this space with the edges resting on and supported by the sprocket 21 and the outer flange of drum 4 respectively. Supported within sprocket 21 by means of brackets 23 rigidly secured to plate 13, is the sound printing head 24 which includes a suitable light source 25 adapted to project a beam of light through a slit 26 formed in the wall 27 of the head onto the superimposed sound and sensitized film strips so as to photographically reproduce the sound track on the strip P. Wall 27 of head 24 is shaped to conform to the curvature of the drum 4 and sprocket 21 and coacts with an outer guide block 28 to maintain the two film strips in fixed relationship to one another as they pass by the slit 26.

The means for guiding the film strips past the various sound and picture printing stations is best shown in Figs. 1 and 3. Due to the coaxial arrangement of the sound sprocket and the printing drum the sound printing head lies in a plane to one side of the plane of the picture printing station which may be considered as a plane lying substantially half way between the rows of teeth 5 and 6 on the drum 4. In the following description of the film guiding means the various drums, sprockets, guide rollers, etc., referred to are, unless specifically otherwise described, to be considered as lying in the picture printing plane.

As shown at the lower left-hand corner of Fig. 1, the sensitized film strip P with the red separation film strip R superimposed thereon are drawn from their respective supply drums (not shown) by means of a driven sprocket 29, being held thereagainst by suitable presser rollers 30 and 31. From roller 31 the strips lead over individual tension rollers 32 and 33 respectively, and guide rollers 34 and 35, and then are again brought into superimposed relationship as they pass beneath guide pins 36 and 37 which serve to hold the strips against the periphery of the drum 4 as they pass beneath the red printing or exposure head 8. The strips then pass over stripper 38 and roller 39 and into engagement with a second driven sprocket 40 with its associated presser rollers 41 and 42. Red separation strip R is then separated from the strip P and is led off as indicated at 43 to a suitable take-up reel (not shown).

Film strip P, after passing from under roller 42 is formed into a loop as shown at 44 and is again led back into engagement with sprocket 40, being held thereagainst by rollers 45 and 46. The green separation film strip G is also fed from its supply drum (not shown) beneath rollers 45 and 46 so that it is superimposed upon strip P as it passes around sprocket 40. The strips P and G are then guided, as before, past the green printing head 9 and to a driven sprocket 48.

As best shown in Fig. 3, sprocket 48 is a double sprocket comprising an inner sprocket section 48' lying in the picture printing plane and an outer sprocket section 48'' lying in the plane of the sound printing head. The film strips P and G are held against the inner sprocket section 48' by presser rollers 49 and 50 and, as in the previous case, the green strip G, after passing beneath roller 50, is led away as at 51 to a take-up reel (not shown). The strip P is again formed into a loop 52 after passing beneath roller 50 and this loop is twisted laterally so that the leading portion thereof is brought into the vicinity of the outer sprocket section 48''. Mounted coaxially with roller 50, and in the plane of the sound printing head and of outer sprocket section 48'' is a second presser roller 53. The film strip S bearing the master sound track is led as indicated at 54 from a supply reel (not shown), passing beneath roller 53 and about the outer section 48'' of drum 48 as indicated at 55, and this strip S, with the strip P superimposed thereon, is then held in engagement with the sprocket section 48'' by means of additional presser rollers 56 and 57, each of which lies in the sound printing plane. After leaving roller 57, the films S and P are led over tension rollers 58 and 59 and guide rollers 60 and 61 into engagement with the sound sprocket 21, being held thereagainst by the action of rollers 62 and 63 and guide block 28. As shown in Fig. 2, light from the source 25 will pass through the slit 26 and expose a portion of the sensitized strip P to the sound track appearing on strip S. After leaving the sound head and sprocket, strips S and P pass around rollers 64 and 65 and tension rollers 66 and 67 and into engagement with the outer portion 68'' of a second double sprocket 68, best shown in Fig. 3. Rollers 58 through 67 are, of course, also in the plane of the sound printing head. Rollers 69 and 70 serve to hold the two film strips against the portion 68'' of sprocket 68 and, after passing beneath roller 70, strip P is formed into a twisted loop as at 74 so that its leading portion is again brought into the plane of the picture printing drum. The sound film S continues around the periphery of portion 68'' of sprocket 68 under a presser roller 71 and is then led off as indicated at 72 to a suitable take-up reel (not shown).

Mounted coaxially with roller 71, and in the plane of the picture printing drum, is another presser roller of the picture printing drum, is another presser roller 73. The blue separation print or film B is led as indicated at 75 around this roller 73 and into superimposed relationship with the positive strip P, the two superimposed film strips then passing about the periphery of the inner portion 68' of roller 68 and around the presser roller 76. From this point the two film strips are conducted as before past the blue printing station 10 and from that point are conducted to the drive sprocket 29 against which they are held by presser rollers 77 and 78. After passing roller 78, the two strips P and B are led off as indicated at 79 and 80 to their respective take-up reels (not shown).

The operation of the printer is thought to be obvious from the above description. At each of the picture printing stations the composite film is exposed to one of the separation color prints or negatives, the time of exposure being determined by the size of the cut-out portion 20 in the shutter 17. As previously described, the arrangement of teeth 5 and 6 on the picture printing drum 4 is preferably like that fully shown and described in my prior Patent No. 2,552,255 so that, at each of the printing stations, the two superimposed film strips may rearrange themselves slightly relative to one another so that, during the actual exposure time, they will be in exact registry. No such slippage can be permitted in the printing of the sound so that the teeth on the sound sprocket 21 will be arranged so that they will maintain the two strips of film in fixed relation to one another during their entire time of travel past the sound head. By using a "bent" optical system at the various picture printing stations, that is, an optical system using prisms to bend the beam toward the periphery of the printing drum, it is possible to mount the printing lamps 11 with their filaments vertical inside of the main housing 1 and in such position that a simple disklike shutter may be employed to control the exposure time at all three picture printing stations. Since the shutter is mounted concentrically with the printing drum, the problem of supporting this unit and of driving it in proper timed relationship to the rotation of drum 4 is greatly simplified. Furthermore, the mounting of the sound sprocket coaxially with the picture drum 4 provides an extremely compact arrangement as well as simplifying the problem of shielding the sound printing lamp 25.

As previously described, the optical system used at the printing stations is preferably of the type shown and described in my copending application Serial No. 299,884, but it is to be understood that other known optical systems could obviously be substituted without departing from the general physical arrangement of the parts relative to the printing drum. It is equally apparent that many other changes in the specific arrangement of the parts could be made without departing from the spirit and scope of the invention as defined by the appended claims.

I claim:

1. A continuous printer for photographically exposing a sensitized film strip at each of a plurality of stations, comprising a drum mounted for rotation in a given plane, means located in the plane of rotation of said drum for guiding said strip into and out of driven engagement with said drum, and means at each of said stations for exposing said strip and including means offset to one side of the plane of rotation of said drum for projecting a beam of light onto said strip, a shutter mounted coaxially with said drum and arranged upon rotation to periodically pass between each of said beam projecting means and the plane of rotation of said drum to control the period of exposure of said strip at each of said stations, a sprocket mounted coaxially with said drum to the other side of said plane of rotation, and guide means located between two adjacent stations for guiding said strip from the plane of said drum laterally into the plane of said sprocket, thence into driven engagement with said sprocket and thence laterally back into said first plane, and means mounted adjacent said sprocket for exposing a predetermined unexposed portion of said strip adjacent one edge thereof.

2. In a continuous photographic printer having a driven printing drum and a plurality of printing stations spaced about the periphery of said drum for photographically exposing a sensitized film strip successively through each of a plurality of master film strips, means on said printing drum for drivingly engaging said sensitized film strip at each of said stations to advance said strip past that station, means for exposing said sensitized film to a sound track including a sound sprocket mounted coaxially with and to one side of said printing drum and arranged for rotation conjointly therewith, film guiding means located between a pair of adjacent printing stations for engaging said sensitized strip as it leaves one of said pair of printing stations and for guiding it from the plane of said printing drum laterally into the plane of said sound sprocket and into driven relationship therewith, and other guide means for engaging the sensitized strip after it leaves the sound sprocket and for guiding it laterally back into the plane of said printing drum ahead of the other of said pair of printing stations.

3. In a photographic printer for sequentially photographically exposing successive frame areas of a sensitized film strip to corresponding frames of each of a plurality of individual master films, a drum mounted for rotation about a given axis, a plurality of exposure stations, one corresponding to each of said master films, spaced about the periphery of said drum, each of said stations including means for projecting a beam of light onto the periphery of said drum, substantially normal thereto at that station, guide means adjacent each of said stations and cooperating with said drum for holding said sensitized film and the corresponding one of said master films in fixed superimposed relationship on the peripheral surface of said drum as they traverse the beam of light at that station, and a shutter mounted for rotation about said axis and adapted upon rotation to periodically and sequentially intercept each of said beams to control the exposure time at each of said stations, said drum and said shutter being rotatably driven at different rates whereby said shutter will make one complete revolution during the time required for the drum to advance the films one frame unit.

4. In a photographic printer for sequentially photographically exposing successive frame areas of a sensitized film strip to corresponding frames of each of a plurality of individual master films, a drum mounted for rotation about a given axis, a plurality of exposure stations, one corresponding to each of said master films, spaced about the periphery of said drum, each of said stations including means for projecting a beam of light onto the periphery of said drum, substantially normal thereto at that station, guide means adjacent each of said stations and cooperating with said drum for holding said sensitized film and the corresponding one of said master films in fixed superimposed relationship on the peripheral surface of said drum as they traverse the beam of light at that station, and a shutter mounted for rotation about said axis and adapted upon rotation to periodically and sequentially intercept each of said beams to control the exposure time at each of said stations, said drum and said shutter being rotatably driven at different rates whereby said shutter will make one complete revolution during the time required for the drum to advance the films one frame unit, said light projecting means including a light source for each of said stations, said light sources being located to one side of the plane of said drum, and said shutter lying in a plane between the plane of said drum and that of said light sources.

5. In a continuous photographic printer having a driven toothed drum, a picture printing station adjacent said drum, and means for guiding a pair of perforated film strips into contact with the portion of the toothed peripheral surface of said drum adjacent said station for driven engagement by said drum during movement of said strips past said printing station to photographically expose one of said strips at said station, sound track printing means arranged to one side of said drum and including a sprocket mounted coaxially with said drum and spaced therefrom and a sound printing head mounted between said sprocket and said drum, and means for guiding said one strip from the plane of said drum laterally into the plane of said sprocket and into superimposed relationship with a third film strip drivingly engaged with said sprocket.

6. In a continuous photographic printer having a driven toothed drum, a picture printing station adjacent said drum, and means for guiding a pair of perforated film strips into contact with the portion of the toothed peripheral surface of said drum adjacent said station for driven engagement by said drum during movement of said strips past staid printing station to photographically expose one of said strips at said station, sound track printing means arranged to one side of said drum and including a sprocket mounted coaxially with said drum and spaced therefrom and a sound printing head mounted between said sprocket and said drum, and means for guiding said one strip from the plane of said drum laterally into the plane of said sprocket and into superimposed relationship with a third film strip drivingly engaged with said sprocket, the teeth on said drum being arranged to provide for limited relative shifting of said pair of strips during a portion of their travel past said station while holding said strips in fixed relationship to one another during the remainder of their travel past said station, and the teeth on said sprocket being arranged to maintain said one strip and said third strip in fixed relationship to one another throughout their travel past said sound head.

7. In a continuous photographic printer for sound film, a drum, a picture printing station adjacent the periphery of said drum for exposing the picture portion of a sensitized film strip as it moves in a given plane about the periphery of said drum past said station, a sprocket coaxial with said drum and spaced axially therefrom, the spacing between said drum and said sprocket being slightly less than the width of said film strip, a sound track printing head mounted between said drum and sprocket in a plane offset laterally of said given plane and means for guiding said film strip laterally from said given plane into engagement with said sprocket so that said strip straddles the space between said drum and said sprocket in the area of said sound track printing head.

References Cited in the file of this patent

UNITED STATES PATENTS

| | | |
|---|---|---|
| 1,923,987 | Luboshez | Aug. 22, 1933 |
| 2,525,522 | Capstaff | Oct. 10, 1950 |
| 2,533,447 | Fitch | Dec. 12, 1950 |
| 2,596,373 | Coote | May 13, 1952 |